(12) United States Patent
Topitzer et al.

(10) Patent No.: US 8,706,604 B1
(45) Date of Patent: Apr. 22, 2014

(54) SYSTEM AND METHOD FOR HEDGING RISKS IN COMMERCIAL LEASES

(75) Inventors: Gerald F. Topitzer, New York, NY (US); John C. Barone, Brewster, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 275 days.

(21) Appl. No.: 12/036,842

(22) Filed: Feb. 25, 2008

Related U.S. Application Data

(60) Provisional application No. 60/896,195, filed on Mar. 21, 2007.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 2001/0044771 | A1 | 11/2001 | Usher et al. |
| 2002/0010670 | A1 | 1/2002 | Mosler et al. |
| 2002/0052836 | A1 | 5/2002 | Galperin et al. |
| 2002/0123960 | A1 | 9/2002 | Ericksen |
| 2004/0107161 | A1 | 6/2004 | Tanaka et al. |
| 2005/0086149 | A1* | 4/2005 | Efron et al. ..................... 705/36 |
| 2005/0144119 | A1* | 6/2005 | Monsen et al. ................. 705/38 |

OTHER PUBLICATIONS

"Credit Default Swap (CDS) Primer", Nomura Fixed Income Research, May 12, 2004.*
Bartlam, Martin et al. "Loan-Only Credit Default Swaps", Orrick, 2006.*
Risk, Hamish, "Loan Credit-Default Swaps Surge as Hedge Funds Hunger for Yield", Aug. 22, 2006.*
Cross, Frank B., WEST's Legal Environment of Business: , Cengage Learning, 2006, p. 267.*

* cited by examiner

*Primary Examiner* — Eric T Wong
(74) *Attorney, Agent, or Firm* — Goodwin Procter LLP

(57) ABSTRACT

A system and method for hedging risks in commercial leases is disclosed. In one particular exemplary embodiment, a method for hedging risks in a commercial lease may comprise: receiving information related to a lease agreement between a lessor and a lessee, the lease agreement calling for the lessor to lease an asset to the lessee for a period of time in return for lease payments; estimating potential losses that the lessor will suffer if at least one credit event causes the lessee to default on the lease agreement; and providing the lessor a put option, whereby, upon the at least one credit event, the lessor can choose to sell a claim against the defaulting lessee at a strike price, the strike price being an amount that varies based at least in part on the estimated potential losses and the time at which the lessee defaults.

22 Claims, 8 Drawing Sheets

SYSTEM AND METHOD FOR HEDGING RISKS IN COMMERCIAL LEASES

CROSS REFERENCE TO RELATED APPLICATIONS

This patent application claims priority to U.S. Provisional Application No. 60/896,195, filed Mar. 21, 2007, which is hereby incorporated by reference herein in its entirety.

FIELD OF THE INVENTION

The present invention relates generally to risk management. More particularly, the present invention relates to a system and method for hedging risks in commercial leases.

BACKGROUND OF THE INVENTION

Commercial leases are popular both for some inherent advantages over asset purchases and for tax benefits in U.S. and some other jurisdictions. Many companies and business owners may prefer leasing, rather than purchasing, because leasing is typically less capital-intensive, less risky (in terms of value fluctuations of capital assets), and more flexible. Almost all companies enter into real estate leases to rent office, production, and/or storage spaces. Many companies, such as commercial airlines, automobile manufacturers and construction contractors, routinely rent expensive equipment through long-term leases. Apart from a profitable rate of return, leases may also provide lessors significant tax benefits, such as depreciation deductions and investment credits, which can be shared with lessees to some extent (e.g., through lower lease payments). In fact, in order to reap the tax benefits of an asset lease, a lessor may borrow from a lender most of the funds needed to purchase an asset (e.g., an airliner or heavy machinery) and then lease it to a lessee, wherein the lender is given a senior secured interest on the asset as well as an assignment of the lease and lease payments. Such a lease is known as a leveraged lease, and the lessor is referred to as an equity owner or an equity participant in the lease. While an equity owner does not profit much from lease payments in a leveraged lease, the equity owner may still enjoy a substantial tax benefit.

Lessors or equity owners in commercial leases may operate under a significant risk of lessee default. Unexpected credit events, such as bankruptcy, insolvency, or restructuring of a lessee entity, may cause it to default on a lease. A lessee default will not only deprive the lessor of its income stream of lease payments, but may also put the recovery of the leased asset at risk. In addition, some or all of the tax benefits that the lessor derives from the lease may be rolled back or otherwise lost.

A lessor's risks in the context of bankruptcy or reorganization of a lessee entity are greater than the risks faced by the lessee's other bankruptcy creditors at least under U.S. bankruptcy law. While the lessor (or lease creditor) can pursue a claim against the defaulting lessee in bankruptcy proceedings, such a claim is an unsecured debt which is subordinate to other senior debts which the lessee must satisfy first. The lessee's other senior creditors may include, for example, bondholders, pension plan beneficiaries, secured creditors (mortgagees), and trade receivable creditors (i.e., those owed monies for goods or services already delivered). The status of a lease creditor can be further disadvantaged by the fact that a bankrupt lessee, as part of its restructuring efforts, could reject the lease agreement.

Few risk management options are currently available to lessors. A lessor may try to avoid risky leases by carefully evaluating and monitoring the credit-worthiness of potential lessees or tenants. However, credit-screening and credit-monitoring can be time-consuming and only gauge risks (often imprecisely) as opposed to actually hedging risks. None of the existing risk-hedging tools, such as credit default swap (CDS) contracts, insurance policies, and third-party guarantees, can provide a satisfactory solution that is simply, flexible, and generally available at a reasonable cost.

For example, CDS contracts typically have minimum terms of 1, 3, or 5 years and are only available with respect to lessee companies with sufficient liquidity. A CDS contract typically has a fixed notional amount which does not adjust for the changing nature of risk exposure in a lease. As a result, a CDS hedge for lease risks will almost always prove to be over-hedging or under-hedging. In addition, a CDS contract requires actual settlement with a delivery of lessee's bonds, which is cumbersome and inefficient for implementing the hedge. Therefore, CDS contracts are not amenable to asset leases.

While lease insurance policies are relatively inexpensive for some companies, they tend to be unavailable to distressed or underperforming companies. The underwriting process for a lease insurance policy can be quite long, and so is the claims process which may include a long waiting period. Insurance providers may contest lessors' claims and as a result further delay compensation of lessors' financial losses. Furthermore, instead of receiving a full coverage, the insured may be obligated to pay a 10-20% deductible or co-insurance.

In some cases, a lessor might be able to demand from a lessee some kind of third-party guarantee before entering into a lease agreement. For example, an affiliated entity of the lessee may guarantee lease payments, or a bank may issue a letter of credit on the lessee's behalf. However, such third-party guarantors are not always available, and, in lease negotiations, lessors are not always in a strong bargaining position to insist on third-party guarantees. Furthermore, it may be a complicated and protracted process for a lessor to pursue its claims against a third party after a lessee defaults.

JPMorgan Chase Bank has previously implemented a risk-hedging product known as "account receivables put," whereby a seller in a supply contract may transfer to the bank a claim against a defaulting buyer for outstanding receivables. This product typically applies only to the seller's risk of losing account receivables (owed for goods/services already delivered to buyer). However, the account receivables put is not adaptable to commercial leases since it is not designed to cover losses resulting from lease defaults, such as losses of future lease payments, residual values of leased assets, or lease-specific tax benefits.

In view of the foregoing, it may be understood that there are significant problems and shortcomings associated with current technologies of risk management.

SUMMARY OF THE INVENTION

A system and method for hedging risks in commercial leases is disclosed. In one particular exemplary embodiment, a method for hedging risks in a commercial lease may comprise: receiving information related to a lease agreement between a lessor and a lessee, the lease agreement calling for the lessor to lease an asset to the lessee for a period of time in return for lease payments; estimating potential losses that the lessor will suffer if at least one credit event causes the lessee to default on the lease agreement, the potential losses including one or more types of losses selected from a group consisting of: a loss of the lease payments, a loss of residual value of the leased asset, and other financial losses associated with the lease agreement; and providing the lessor a put option, whereby, upon the at least one credit event, the lessor can choose to sell a claim against the defaulting lessee at a strike price, the strike price being an amount that varies based at least in part on the estimated potential losses and the time at which the lessee defaults.

In another particular exemplary embodiment, a method for protecting a first party in a lease against a risk of default by a second party may comprise: determining a schedule of potential damages that the first party might suffer if the second party defaults on the lease at one or more times during the lease term; structuring a put option that allows the first party to sell, upon a triggering event, a claim of damages against the second party at a strike price, the strike price being determined based at least in part on the schedule of potential damages; pricing the put option at a premium based at least in part on an estimated recovery rate of the claim; and providing the put option to the first party in return for the premium.

In yet another particular exemplary embodiment, a system for hedging risks in a commercial lease may comprise a data processor and a data storage device that are configured to: information related to a lease agreement between a lessor and a lessee, the lease agreement calling for the lessor to lease an asset to the lessee for a period of time in return for lease payments; estimate potential losses that the lessor will suffer if at least one credit event causes the lessee to default on the lease agreement, the potential losses including one or more types of losses selected from a group consisting of: a loss of the lease payments, a loss of residual value of the leased asset, and other financial losses associated with the lease agreement; structure a put option, whereby, upon the at least one credit event, the lessor can choose to sell a claim against the defaulting lessee at a strike price, the strike price being an amount that varies based at least in part on the estimated potential losses and the time at which the lessee defaults; determine a premium for the put option based at least in part on an estimated recover rate of the claim; provide the put option to the lessor in return for the premium; and record data related to the put option, the data including one or more pre-conditions that the lessor must meet before exercising the put option.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

Embodiments of the present invention provide for risk management techniques to hedge risks, with a lease put instrument, in commercial leases. The lease put may be a dynamic hedge having a notional amount that adjusts commensurate with a lessor's risk exposure during a lease term. Upon entering into a lease agreement or during the term of a lease, a put option (i.e., a lease put) may be provided to the lessor. When the lessee defaults on the lease, resulting in damages to the lessor, the lessor may exercise the put option by selling its claim of damages against the lessee at a strike price. The claim of damages may be sold to a provider of the put option or an obligor designated in the put option contract. The strike price may be a predetermined percentage of the claim amount which typically varies depending on the time of default. By exercising the put option, the lessor may recover at least a portion of its financial losses. Losses covered with the lease put instrument may include one or more of the following types: a loss of lease payments, a loss of residual value of leased assets, and a loss of tax benefits derived from the lease. The lease put may be structured and exercised in a number of ways and may offer several advantages over existing risk-hedging methods, as will be described in detail below.

Figure 1:
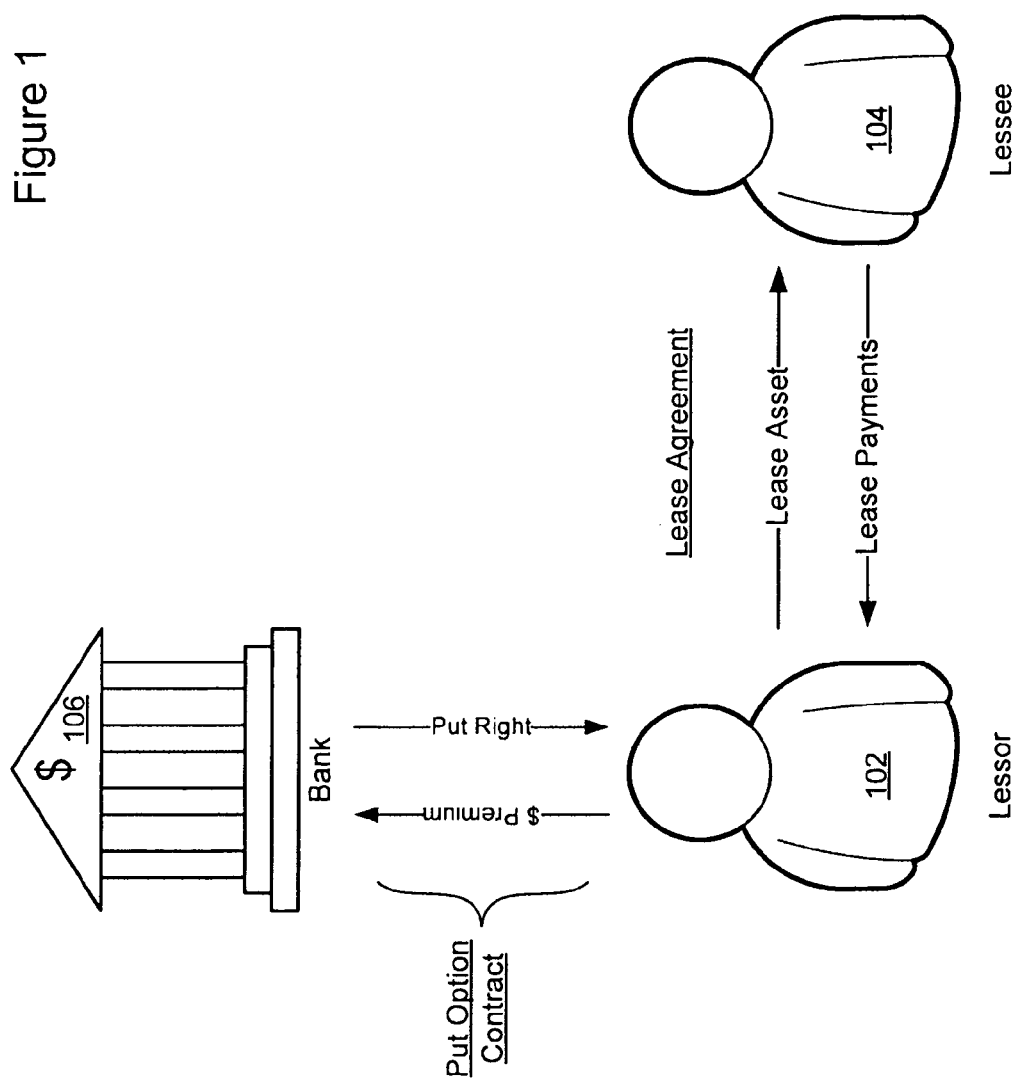
FIG. 1 shows a block diagram illustrating an exemplary method of providing a lease put option to a lessor in accordance with an embodiment of the present invention.

Referring to FIG. 1, there is shown a block diagram illustrating an exemplary method of providing a lease put option to a lessor in accordance with an embodiment of the present invention.

In this exemplary embodiment, a lease agreement may be formed between Lessor 102 and Lessee 104. Lessor and Lessee may each be a person, a group of persons, or an organization with legal authority to enter into a binding contract. Lessor may be committed to provide a lease asset to Lessee for its possession or use over a period of time. In return, Lessee may be committed to make a series of lease payments to Lessor, typically on a periodic basis. For example, Lessee may be a major commercial airline and Lessor may be in the business of leasing passenger jets. Rather than spending a large amount of capital to purchase new passenger jets, the airline may find it more beneficial to lease such expensive equipment partly because the generous tax deduction from an accelerated depreciation can be shared between Lessor and Lessee. For another example, Lessee may be a construction company that is in need of new machinery but does not have enough cash for the purchase. In equipment leases, the lease terms often last the entire usable life (or a significant portion thereof) of the leased assets. So, Lessee may have full use and possession of the leased asset almost as if Lessee bought the asset, except for the residual (or end-of-life) value of the asset. For purposes of the present invention, the equipment lease may be of any length of time, such as a short-term lease or a long-term lease. In FIG. 1, the lease agreement may also be for a piece of real estate property, such as an office building (or office space therein), a parking lot, or a storage warehouse. The real estate lease is typically a term-of-years lease but may also be of any length of time.

Lessor may be concerned about a default by Lessee, especially if Lessee is under financial stress or has a low or declining credit rating. In order to reduce its risk exposure to a potential default, Lessor may enter into a put option contract with a third party. The third party may be typically a financial institution (e.g., an investment bank), a risk management firm, or the like. Here, the third party that provides the put option is referred to as "Bank" (106). With the put option contract, Bank may provide Lessor a right (but not an obligation) to sell its claim of damages against Lessee, upon one or more triggering events, to Bank at a strike price. Accordingly, the put option contract may also be referred to as a "Stand-by Claims Purchase Agreement," as Bank is effectively standing by to take over Lessor's claim against Lessee upon its default. In return for this right, Lessor pays Bank a risk premium either up front or by installments. The triggering events may include credit events, such as bankruptcy or insolvency (e.g., missed payments on bonds or other debt instruments issued by Lessee), which prevent Lessee from fully performing its duties under the lease agreement. The triggering events may also include a material breach of the lease agreement (e.g., one or more missed lease payments) and a rejection or repudiation of the lease by Lessee.

The put option, referred to as "a lease put," may be structured in a variety of ways. Lessor's risk exposure may be related to three types of financial losses: a loss of lease payments, a loss of residual value in the leased asset, and a loss of tax benefits. The lease put may help hedge Lessor's risk exposure to any of these financial losses or a combination thereof. Alternatively, each type of these risks may be separately hedged with a lease put or a similar instrument. Most typically, the lease put may be implemented to hedge an uncollateralized part of the potential loss of lease payments. It may be assumed that Lessor will be able to fully recover the residual value (or liquidation value) of the leased asset. If Lessor is concerned about its chance of reclaiming the leased asset or the rate at which the leased asset can be liquidated, then the lease put may also be structured to cover the residual value of the leased asset or a separate lease put may be set up for that purpose. Similarly, the lease put (or a separate one) may cover the loss of tax benefits, especially during a earlier portion of the lease term, if accelerated depreciation applies.

Whichever type of risks the lease put hedges, the amount of risk exposure typically varies depending on the exact time during the lease term when Lessee happens to default. For example, as Lessee continues to make lease payments as agreed, Lessor's risk exposure to the loss of lease payments will decrease over time. Also, the residual value in the lease asset typically decreases with time, and so do the tax benefits derived from the lease. Therefore, the lease put may have a notional amount that is adjusted down to match Lessor's declining risk exposure under the lease agreement. The notional amount is a reference figure based on which Lessor is paid for its claim of damages.

With the put option contract, Lessor may effectively shift at least a portion of its lease risks to Bank. Bank may price the lease put at a premium to offset its own risk exposure due to its obligation to purchase Lessor's claim of damages. Bank may determine the risk premium based at least in part on an estimate of recovery risk (e.g., whether and how much of Lessor's losses can be recovered from Lessee). The risk premium may be paid to Bank up front, that is, at or near the formation of the put option contract. Alternatively, the risk premium may be paid in installments, for example, in relation to the schedule of lease payments or on other periodic basis.

Figure 2:
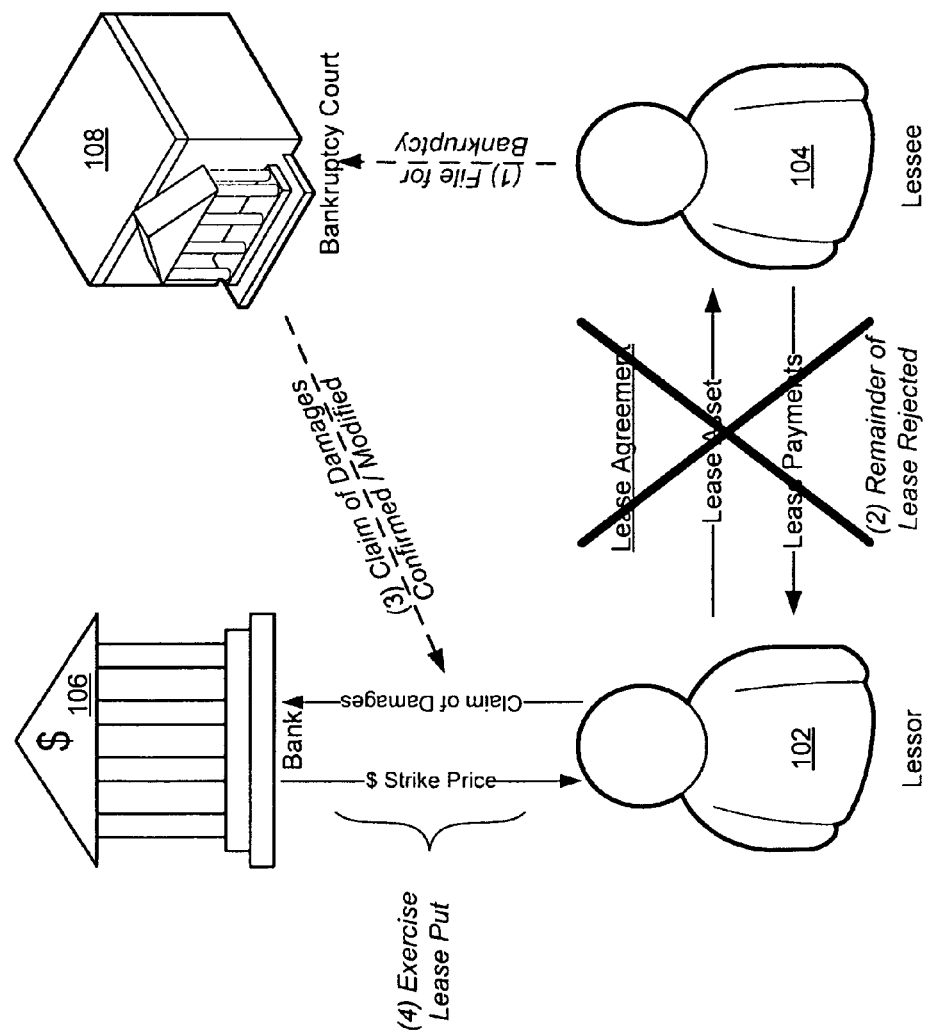
FIG. 2 shows a block diagram illustrating an exercise of a lease put option by a lessor for a claim of damages in accordance with an embodiment of the present invention.

FIG. 2 shows a block diagram illustrating an exercise of a lease put option by a lessor for a claim of damages in accordance with an embodiment of the present invention. Continuing with the example of Lessor 102 and Lessee 104 as shown in FIG. 1, FIG. 2 now shows how Lessor 102 might exercise the lease put option for which Bank 106 may be both a provider (issuer) and an obligor.

The put option contract may have specified one or more events that can trigger Lessor's right to exercise the lease put. The triggering events may include credit events which cause Lessee to default, such as bankruptcy of Lessee, restructuring of Lessee entity, Lessee failing to pay a previously agreed financial obligation (e.g., missed payments on bonds or debentures, or missed lease payments to Lessor), or other events that significantly impairs Lessee's credit-worthiness. The triggering events may also include a material breach of the lease agreement by Lessee. For simplicity, FIG. 2 shows Lessee filing for bankruptcy with Bankruptcy Court 108, which may lead to a chain of events that will trigger Lessor's right to exercise the lease put. Depending on specific provisions of the put option contract, Lessor may have to wait until Lessee affirmatively rejects the lease. Then, Lessor may submit its claim of damages against Lessee to Bankruptcy Court. Once the claim of damages has been confirmed or modified (e.g., reduced to a lower amount) by Bankruptcy Court, Lessor may take the judicially approved claim and sell it to Bank at the appropriate strike price by exercising the lease put. That is, the claim of damages may be assigned to Bank, and, in return, Bank may pay the strike price which may be equal to or less than the notional amount of the lease put. Now, Lessor is at least partially compensated for the damages caused by Lessee default. Bank, who is legally substituted into Lessor's role as a claimant-creditor, may pursue the claim of damages against Lessee. More preferably, Lessor may retain and pursue the claim on Bank's behalf and pass on any amount that has been collected from Lessee.

It should be noted that the original provider of the lease put need not be the same entity as the obligor with whom Lessor exercises the lease put. For example, Bank may contract with Lessor to confer it a right to exercise the lease put with another entity such as a collections company or an investment firm. Alternatively, Bank may sell the put option contract or delegate its obligation under the put option contract to a third party. In any case, Lessor should still be able to exercise the lease put pursuant to the put option contract.

Figure 3:
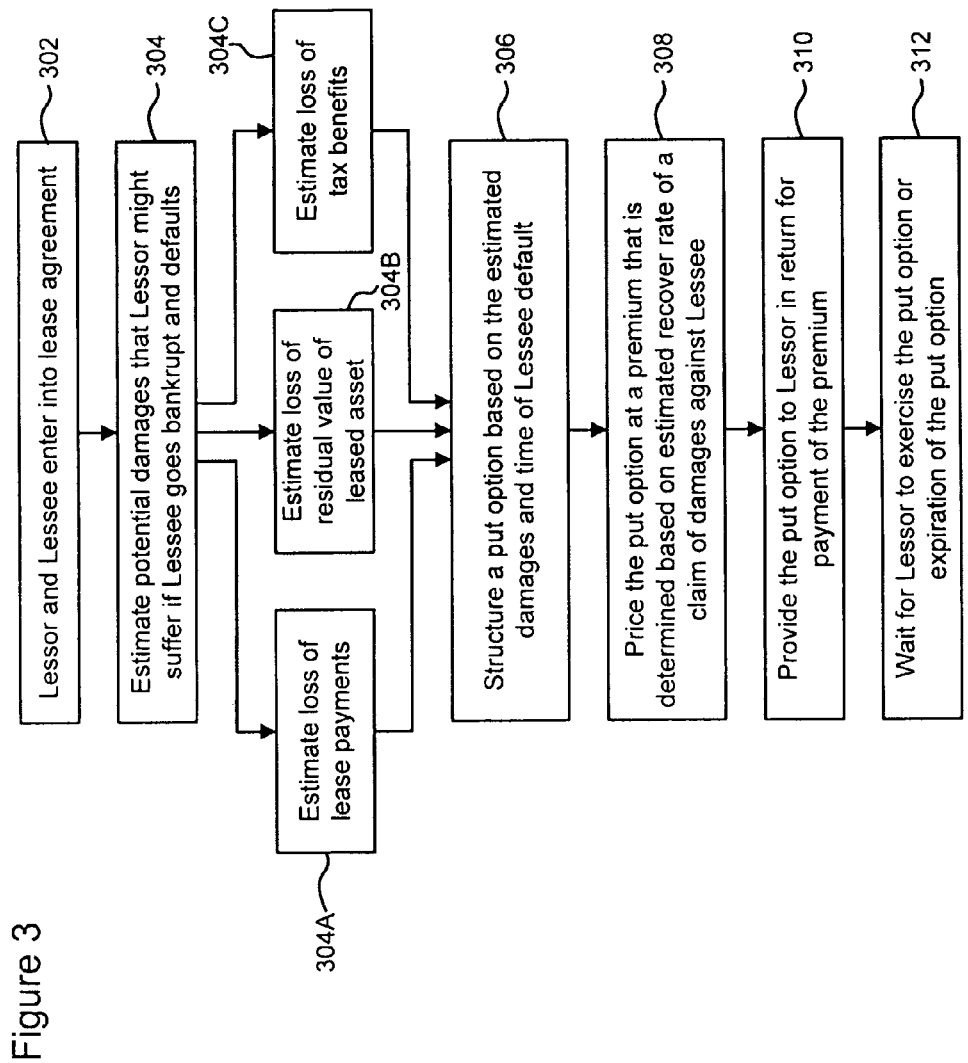
FIG. 3 shows a flow chart illustrating an exemplary method of providing a lease put option in accordance with an embodiment of the present invention.

FIG. 3 shows a flow chart illustrating an exemplary method of providing a lease put option in accordance with an embodiment of the present invention.

In step 302, a Lessor and a Lessee may enter into a lease agreement whereby Lessor provides an asset (real or personal property) for Lessee to use and in return Lessee promises to make lease payments.

In step 304, it may be estimated as to what potential damages Lessor might suffer if Lessee goes bankrupt and defaults on the lease agreement. For example, the lease term may be divided into a plurality of time periods (e.g., according to lease payment intervals or calendar months). For each of those time periods and assuming that Lessee defaults during that time period, the amount of potential damages may be estimated. Depending on desired protection against the potential damages, one or more of steps 304A, 304B and 304C may performed to estimate the different types of potential losses that may result from Lessee default.

For example, a loss of lease payments may be estimated in step 304A. When Lessee defaults during a time period, Lessor will lose lease payments for the remainder of the lease term. The total amount of those lease payments as specified in the lease agreement may be discounted to a present value and then aggregated to arrive at an amount of potential damages for lost payments. The portion of that damages amount not collateralized by the leased asset may reflect the loss of lease payments. The calculation may also take into account any damages provision included in the lease agreement and the likelihood of such damages being paid by the defaulting Lessee.

A loss of residual value in the leased asset may be estimated in step 304B. Upon Lessee default, Lessor may expect to reclaim the leased asset from Lessee and then either lease it or sell it to recover whatever value is left. If the lease put also covers the recovery of residual asset value, the amount of potential damages may also include all or part of any shortfalls between an estimated residual value and an actual recovered or liquidated value of the lease asset. Calculation of the loss of residual value may take into account such factors as a likelihood of reclaiming the leased asset from the defaulting Lessee, expected conditions of the asset based on the time of default, and the liquidation value of the reclaimed asset based on market conditions and/or Lessor's ability to liquidate or salvage used assets.

A loss of tax benefits may be estimated in step 304C. The tax benefits may include any or all benefits that Lessor legitimately expects to derive from a favorable tax treatment of the lease. For example, the tax benefits may be the result of an accelerated depreciation in the capital value of the leased asset and/or an investment credit earned or to be earned by Lessor. When Lessee defaults, Lessor may no longer be able to take full advantages of these tax benefits, which may further impact Lessor's long-term and/or near-term financial planning and may cause Lessor to incur other unplanned expenses. The estimated loss of tax benefits, as well as other incidental losses, may be included in the amount of potential damages.

In step 306, a lease put may be structured to give Lessor a future right to sell its claim of damages at one or more strike prices. Coverage of the lease put may be determined based on the estimated potential damages. For example, Lessor may feel comfortable with its chance of fully recovering residual value in the leased asset and may choose only to hedge the loss of uncollateralized lease payments. Alternatively, Lessor may include some coverage of the residual asset value in the lease put. Or, Lessor may further choose to hedge the loss of tax benefits, as well, which may be for the entire lease term or a portion thereof. Based on the desired coverage, a notional amount of the lease put may be established either as a predetermined amount that varies with the time of default or as the actual claim amount to be fixed after the default. A strike price may be set as a predetermined percentage (or purchase rate) of the notional amount.

The percentage (or purchase rate) or the methods of calculating the strike prices need not be uniform for all the time periods. Instead, those parameters may vary according to one or more market indices or variables as specified in the option contract. For instance, the parties may use Lessee's credit rating (e.g., as published in the CDS market or by specific rating services) as a reference in adjusting the purchase rate.

If Lessee has a first credit rating at time of default, the purchase rate of Lessor's claim may be a first percentage. In contrast, if Lessee defaults with a second credit rating which is lower than the first credit rating, the purchase rate of Lessor's claim may be a second percentage that is lower than the first percentage. Since a lower credit rating of Lessee translates to a smaller likelihood of recovering damages from Lessee, the provider or obligor of the lease put may prefer paying less for Lessor's claim against Lessee. If, in the option contract, Lessor agrees to such an adjustable purchase rate, Lessor may be able to pay a smaller risk premium since a portion of Lessee's credit risk remains with Lessor.

In step 308, the lease put may be priced at a premium that reflects the amount of risk shifted from Lessor to a third party. The third party may be the provider or issuer of the put option or another entity which bears the obligation of buying Lessor's claim of damages at the appropriate strike price. The risk premium may be determined based at least in part on an estimated recovery rate of the claim of damages. That is, the risk premium depends on how likely the damages can be recovered from the defaulting Lessee. The provider of the lease put may need to gather information on Lessee to gauge its financial conditions and credit ratings. The provider may also want to review the underlying lease agreement to ensure that there are no legal loopholes that might impact the chance of recovery. Also, the risk premium may depend on the purchase rate, that is, how the strike prices compare to the corresponding notional amount. If Lessor is to sell its claim of damages at a discount (i.e., below par value), an obligor who buys the claim need not recover the full claim amount in order to break even. In that case, the provider or obligor of the put option takes less risk and demands a smaller risk premium. In any case, the risks shifted from Lessor may be priced into the premium.

In step 310, the lease put may be provided to Lessor in return for one or more payments of the risk premium that has been determined in step 308. A put option contract is now formed between Lessor and the provider or writer of the option contract. Alternatively, the put option contract may be entered into between the provider and an entity other than Lessor but with Lessor as a third-party beneficiary. In another variation, the put option contract between Lessor and the provider may designate a third-party obligor who is to purchase Lessor's claim upon one or more triggering events.

The put option contract may take effect at the same time as the underlying lease agreement. Alternatively, the put option contract may be set up and take effect during the lease term but prior to any default by Lessee.

In step 312, the provider or obligor of the put option may wait for Lessor to exercise the lease put or await expiration of the lease put. Lessor may be allowed to exercise the lease put in a number of ways upon occurrence of one or more triggering events and by meeting one or more pre-conditions, as will be described in detail below. The lease put may typically have an expiration date which is related to the term of the underlying lease. For example, the lease put may be set to expire upon a last lease payment under the lease payment or within a time period after the last lease payment is made. Alternatively, the lease put may expire when Lessee has returned the leased asset to Lessor upon termination of the lease agreement.

Figure 4:
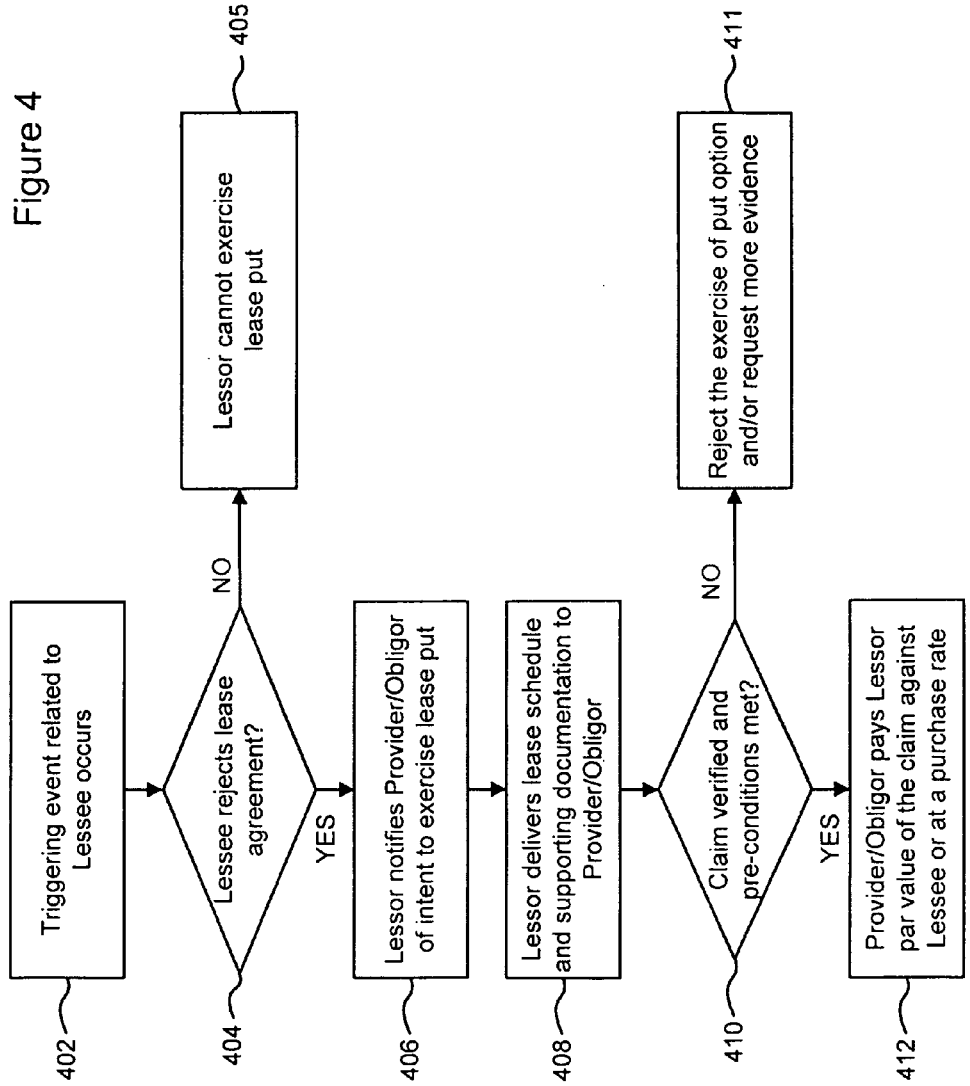
FIG. 4 shows a flow chart illustrating an exemplary method of exercising a lease put option in accordance with an embodiment of the present invention.

FIG. 4 shows a flow chart illustrating an exemplary method of exercising a lease put option in accordance with an embodiment of the present invention. Continuing with the example of the put option contract associated with the lease agreement between Lessor and Lessee (as illustrated in FIG. 3). FIG. 4 shows how Lessor may exercise the lease put.

In step 402, a triggering event related to Lessee may occur. The triggering event may be a credit event that is recognized in the traditional CDS market or an event specified in Lessor's put option contract. For example, Lessee may have filed for bankruptcy to restructure or reorganize its business or to liquidate its assets to satisfy outstanding debts. Or, Lessee may have defaulted on its major debt instruments and/or have had its credit ratings lowered. Alternatively, there may be a material breach of the lease agreement by Lessee, such as one or more missed payments or destruction of the leased asset. Lessor may receive a written notice from either Lessee or a trustee in bankruptcy who handles distribution of Lessee's assets to creditors. Such notice may also come from a monitoring agency or other parties.

In step 404, it may be determined whether Lessee has rejected or repudiated the lease agreement. If Lessee is in bankruptcy, it may have the legal choice of rejecting the remainder of the lease agreement. In non-bankruptcy situations, Lessee might also find it necessary or economically efficient to repudiate the lease agreement. If Lessee has not rejected or repudiated the lease agreement, Lessor will not be able to exercise its lease put (step 405). If Lessee does reject or repudiate the lease agreement, then, in step 406, Lessor may notify a provider or obligor of the lease put that Lessor intends to exercise its lease put.

In step 408, Lessor may deliver the lease schedule and/or other supporting documentation to the provider or obligor to substantiate a claim of damages against Lessee.

Then, in step 410, the provider or obligor of the lease put may verify Lessor's claim of damages and determine whether one or more pre-conditions specified in the put option contract have been met. If the claim is not verified or at least one pre-condition has not been met, the exercise of the lease put may be rejected and/or more evidence may be requested in step 411.

If the claim is verified and Lessor has met all the pre-conditions, then, in step 412, the provider or obligor of the lease put may pay the par value of the claim or at a predetermined purchase rate, in return for an assignment of Lessor's claim against Lessee.

Figure 5:
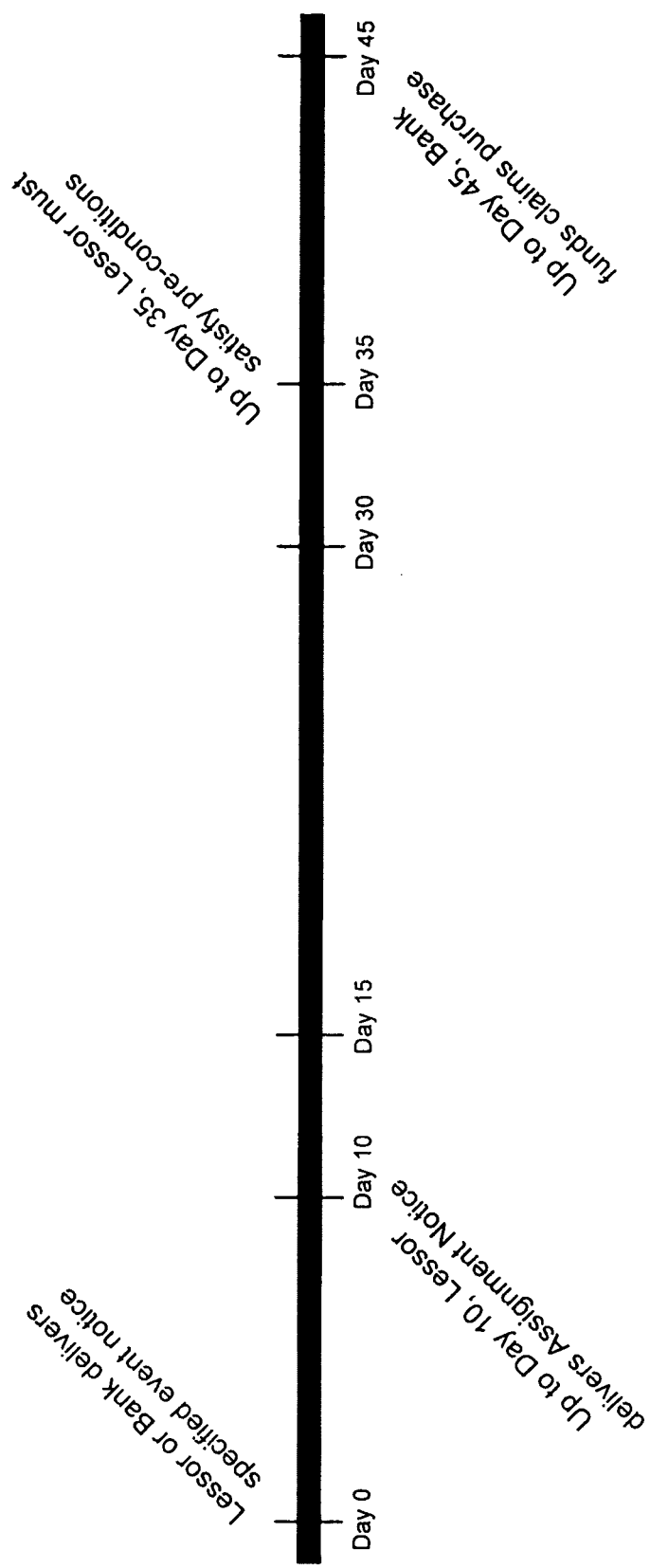
FIG. 5 shows an exemplary timeframe for exercising a lease put option in accordance with an embodiment of the present invention.

The exercise of a lease put typically follows a timeframe specified in the put option contract. FIG. 5 shows an exemplary timeframe for exercising a lease put option in accordance with an embodiment of the present invention. Again, Lessor and Lessee has entered into a lease agreement, and Lessor has entered into a lease put option contract with Bank to hedge risks related to the lease.

A triggering event as specified in the put option contract may occur. The triggering event may be a credit event related to Lessee or a material breach of the lease agreement by Lessee. Either Lessor or Bank may quickly learn of the credit event (usually on the same day) through a credit monitoring agency or similar services and may deliver a specified event notice to the other party. Lessor may learn of the material breach first and may deliver a specified event notice to Bank. The day on which the specified event notice is delivered may be referred to as "Day 0" and may set off a clock for Lessor to take further actions.

Starting from Day 0, Lessor may have up to 10 days (i.e., by Day 10) to deliver an assignment notice that states Lessor's intention to exercise the lease put. Thereafter, Lessor may have up to 25 days (e.g., by Day 35) to satisfy conditions precedent specified in the put option contract. The conditions precedent may require Lessor to deliver a lease schedule and other supporting documentation to Bank so that it can verify Lessor's claim against Lessee for damages. Once Lessor has satisfied the conditions precedent, Bank may have up to 10 days (e.g., by Day 45) to pay Lessor, at a pre-agreed purchase rate, in return for an assignment of Lessor's claim of damages. Typically, Lessor may continue pursuing the claim against Lessee and then pass on any payments collected to Bank.

With the above-described timeframe, the entire process for exercising the lease put is capped at 45 days. In addition, the first 35 days may be further shortened at Lessor's discretion. That is, the sooner Lessor delivers the assignment notice and satisfies the conditions precedent, the earlier Bank can fund the claims purchase.

Figure 6:
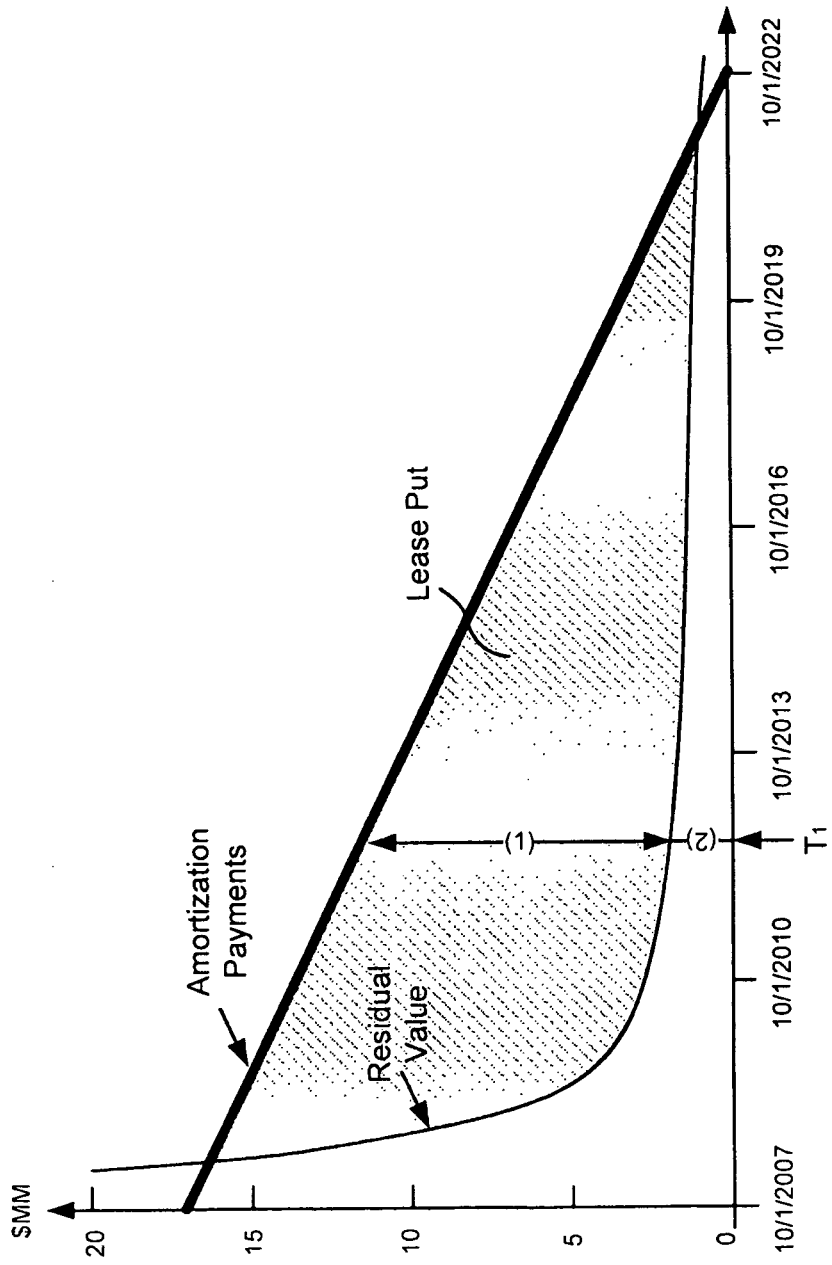
FIG. 6 shows a chart illustrating the economic effects of an exemplary lease put option in accordance with an embodiment of the present invention.

FIG. 6 shows a chart illustrating the economic effects of an exemplary lease put option in accordance with an embodiment of the present invention. An exemplary 15-year lease may be formed between a lessor and a lessee. The lease may run from Oct. 1, 2007 through Oct. 1, 2022, during which time the lessee is to make monthly lease payments to the lessor. A bold, straight line ("Amortization Payments") in FIG. 6 represents a declining balance of lease payments. The Amortization Payments line is typically established based on the lease agreement.

The leased asset may have an initial value of approximately $20 mM (MM denotes million). The value of the leased asset may decline over the 15-year lease term. The lessor may be experienced enough to estimate how a residual value of the leased asset changes over time. Various factors may contribute to the decline of the residual value, such as ordinary wear and tear, technology becoming outdated, and reduced demand for the type of asset. The lessor or some other experts may establish a "Residual Value" curve as shown in FIG. 6 which provides an informed estimate of the residual value of the leased asset at any time during the lease term. As is typically the case, the residual value drops quickly during an early part of the lease term and the decline becomes more gradual in a later part of the lease term.

With the Amortization Payments line and the Residual Value curve, a lease put may be structured to help the lessor hedge a loss of lease payments (uncollateralized) and/or a loss of residual asset value (collateralized). If the loss of uncollateralized lease payments alone needs to be hedged, the lease put may only need to cover the shaded area between the Amortization Payments line and the Residual Value curve. That is, at any point during the lease term, such as $T_1$, the residual asset value (marked "(2)") may be subtracted from the balance of lease payments, such that the uncollateralized amount (marked "(1)") will be the notional amount of the lease put should the lessee default at that point in time. If the loss of the residual asset value is also hedged, the lease put will cover the triangular area formed by the two axis's and the Amortization Payments line. That is, the appropriate notional amount may be the same as or in relation to a vertical distance between the Amortization Payments line and the horizontal time axis. In either case, the notional amount of the lease put will adjust dynamically with the lessor's risk exposure, so that there is little or no over-hedging or under-hedging of the lessor's risks.

Figure 7:
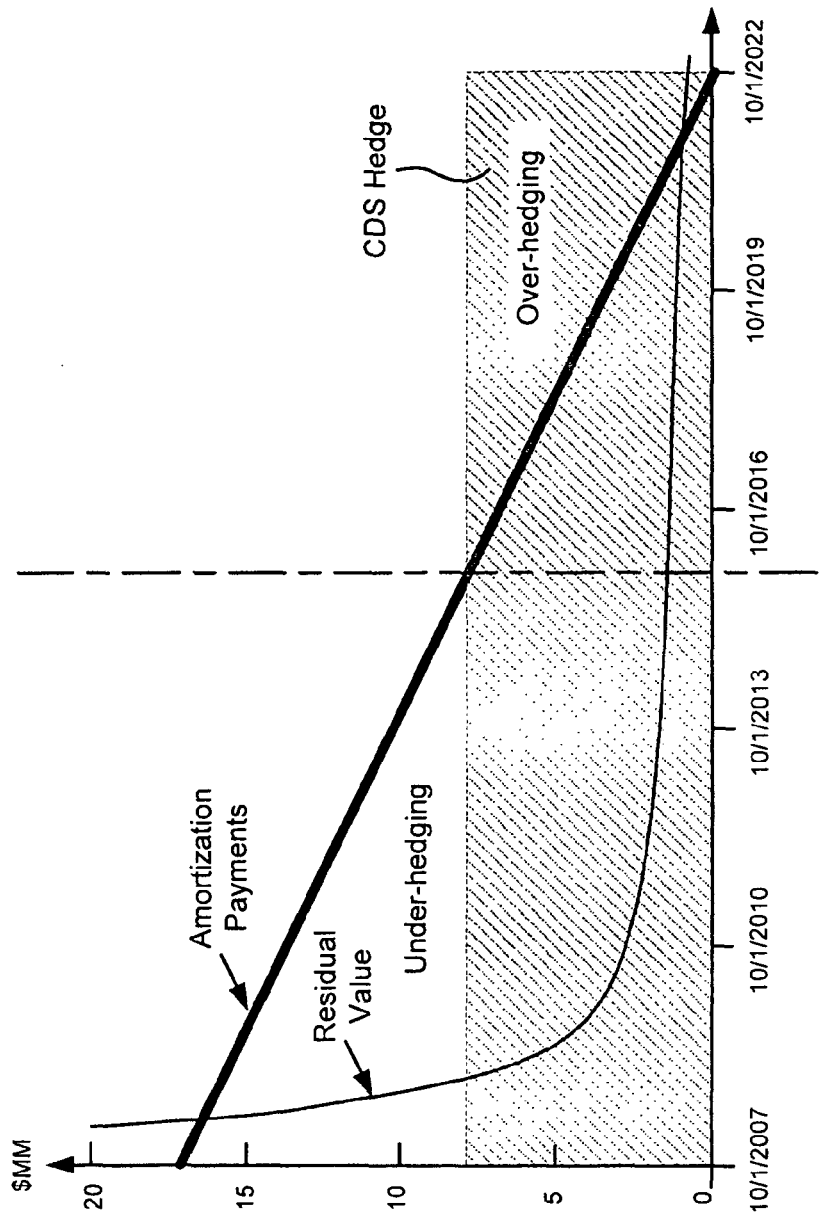
FIG. 7 shows a chart illustrating the economic effects of a traditional CDS hedge.

FIG. 7 shows a chart illustrating the economic effects of a traditional CDS hedge. For comparison, the traditional CDS hedge is applied to the same lease agreement as discussed in connection with FIG. 6. Therefore, FIG. 7 shows the same Amortization Payments line and the same Residual Value curve. Since the traditional CDS contract typically has a fixed notional amount, the amount of losses hedged (represented by the rectangular, shaded area) will remain the same throughout the lease term. As a result, the CDS contract will be under-hedging during a first part of the lease term when the unpaid balance of lease payments is still high. The CDS contract will also be over-hedging during a second part of the lease term, when both the balance of lease payments and the residual asset value are fairly low.

Through the comparison between FIGS. 6 and 7, it may be appreciated that the dynamic adjustment of the notional amount in the lease put instrument is advantageous over the static notional in traditional CDS contracts.

Figure 8:
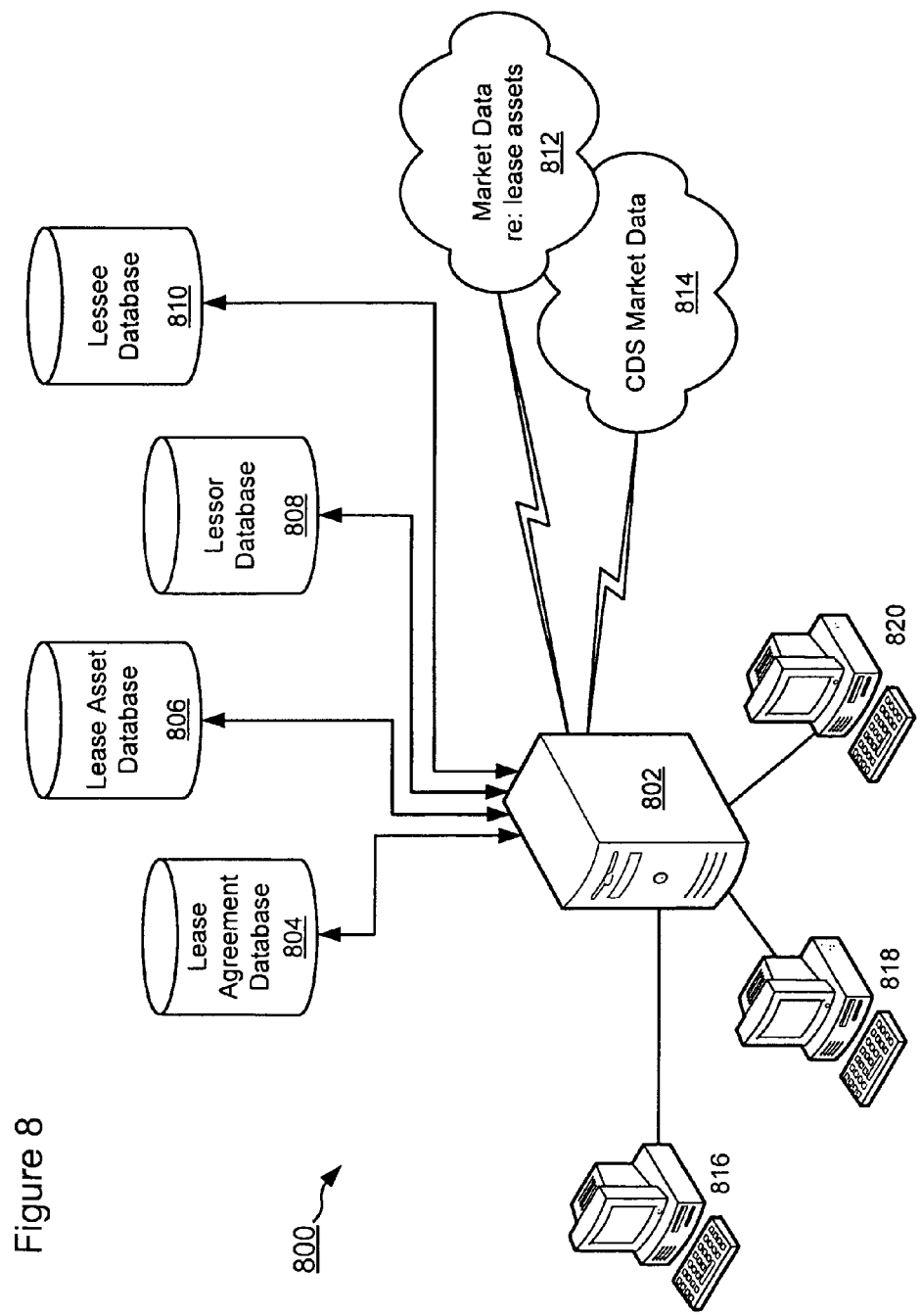
FIG. 8 shows a block diagram illustrating an exemplary system for hedging risks in commercial leases in accordance with an embodiment of the present invention.

FIG. 8 shows a block diagram illustrating an exemplary system for hedging risks in commercial leases in accordance with an embodiment of the present invention.

The system 800 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system 600 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OS1 for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 800 may comprise a data processor 802 that is coupled to a plurality of databases or data sources. For example, the data processor 802 may communicate, locally or remotely, with a Lease Agreement Database 804 that records information related to at least one lease agreement, a Lease Asset Database 806 that records information related to one or more leased assets (e.g., type of asset, cost of acquiring), a Lessor Database 808 that records financial and/or credit data on the one or more lessors, and a Lessee Database 810 that records financial and/or credit data on one or more lessees. Some or all of the databases may be combined. For example, the Lessor Database 808 and the Lessee Database 810 may be combined into a single database that records information on contracting parties. The data processor 802 may be further coupled to or communicate with market information systems to receive, for example, market data 812 regarding lease assets and CDS market data 814 (credit ratings of contracting parties and their CDS spreads). With the various data inputs, the data processor 802 may perform a variety of functions related to the structuring and pricing of put option contracts as well as the administration of the exercising of lease puts. For example, the data processor 802 may take the inputs of lease agreement data, lease asset data, lessor and lessee data and perform a risk analysis based upon these input data. The data processor 802 may then output option parameters such as notional amounts, strike prices, and risk premiums. These parameters may be further recorded in one or more electronic documents to define a lease put or to formulate a put option contract. In addition, the data processor 802 (or another data processor) may receive a signal or instruction that indicates the occurrence of a triggering event or an option-holder's intent to exercise a lease put. The data processor 802 (or another data processor) may then process (i.e., analyze and transform) the data related to the put option contract and the data related to the option-holder's damage claims, and output a decision on whether the lease put can be exercised and, if so, the payment amount (to the option-holder) and the claim amount (to be assigned to the option-issuer).

The system 800 may comprise a plurality of user interfaces or terminals, 816, 818 and 820, for remote or local access to the functionalities of the data processor 802 and the information in the databases or data sources (804-814). The system 800 may be typically maintained by or on behalf of a provider of option contracts, such as a financial institution or a trade/lease facilitator. Alternatively or additionally, the system 800 may be an electronic platform, accessible by a number of parties, which facilitates the formation and implementation of put option contracts among a number of option writers and contracting parties in accordance with embodiments of the present invention. The electronic platform may further facilitate settlements and adjustments related to the lease puts or the put option contracts. In addition, the electronic platform may facilitate trading of the lease puts or the put option contracts and/or the assigning of benefits or delegation of duties related to the options and contracts.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented method for hedging risks in a commercial lease, the method comprising:

receiving at a computer processor information from a database, the information related to a lease agreement between a lessor and a lessee, the lease agreement calling for the lessor to lease an asset to the lessee for a period of time in return for lease payments;

estimating, using the computer processor, potential losses that the lessor will suffer if at least one credit event causes the lessee to default on the lease agreement, the potential losses including one or more types of losses selected from a group consisting of:

a loss of the lease payments, a loss of residual value of the leased asset, and other financial losses associated with the lease agreement;

providing the lessor a put option, whereby, upon the at least one credit event, the lessor can choose to sell a claim against the defaulting lessee at a strike price, the strike price being an amount that varies based at least in part on the estimated potential losses calculated by the computer processor and the time at which the lessee defaults, wherein the put option is exercisable prior to a judicial confirmation or modification of the claim;

receiving, by the lessor, a payment at the strike price pursuant to the put option; and adjusting the payment based at least in part on a judicially confirmed or modified claim amount.

2. The method according to claim 1, wherein the at least one credit event is selected from a group consisting of:
bankruptcy of the lessee;
restructuring of the lessee entity;
the lessee's failure to pay a previously agreed financial obligation;
the lessee's failure to make at least one of the lease payments; and
other events that significantly impairs the lessee's creditworthiness.

3. The method according to claim 1, wherein the strike price is a predetermined percentage of the corresponding estimated potential losses.

4. The method according to claim 1, wherein the strike price is 100% of the corresponding estimated potential losses.

5. The method according to claim 1, wherein the put option is sold to the lessor at a premium that is determined based at least in part on a recovery rate of the claim against the lessee.

6. The method according to claim 1, further comprising:
stipulating one or more pre-conditions that the lessor must meet before exercising the put option, the one or more pre-conditions being selected from a group consisting of:
a definitive rejection or repudiation of the lease agreement by the lessee;
an acknowledgement of bankruptcy or insolvency status from the lessee;
commercially reasonable efforts made by the lessor to mitigate actual losses; and
a cancellation of the lease agreement by a bankruptcy court.

7. The method according to claim 1, further comprising:
receiving a delivery or assignment of the claim from the lessor when the lessor chooses to exercise the put option; and
paying the lessor the strike price in return for the delivery or assignment.

8. The method according to claim 1, wherein the strike price is a predetermined percentage of the judicially confirmed or modified claim amount.

9. The method according to claim 1, wherein the put option is provided to the lessor prior to a first lease payment under the lease agreement.

10. The method according to claim 1, wherein the put option is provided to the lessor subsequent to a first lease payment under the lease agreement but prior to any credit event or expiration of the lease agreement.

11. The method according to claim 1, further comprising:
transferring the put option, by the lessor to a party other than the lessee.

12. A system for hedging risks in a commercial lease, the system comprising:
a data processor and a data storage device that are configured to:
store and retrieve information related to a lease agreement between a lessor and a lessee, the lease agreement calling for the lessor to lease an asset to the lessee for a period of time in return for lease payments;
estimate potential losses that the lessor will suffer if at least one credit event causes the lessee to default on the lease agreement, the potential losses including one or more types of losses selected from a group consisting of:
a loss of the lease payments,
a loss of residual value of the leased asset, and
other financial losses associated with the lease agreement;
structure a put option, whereby, upon the at least one credit event, the lessor can choose to sell a claim against the defaulting lessee at a strike price, the strike price being an amount that varies based at least in part on the estimated potential losses and the time at which the lessee defaults, wherein the put option is exercisable prior to a judicial confirmation or modification of the claim;
determine a premium for the put option based at least in part on an estimated recover rate of the claim;
provide the put option to the lessor in return for the premium; and
record data related to the put option, the data including one or more pre-conditions that the lessor must meet before exercising the put option;
receive a payment by the lessor at the strike price pursuant to the put option; and
adjust the payment based at least in part on a judicially confirmed or modified claim amount.

13. The system according to claim 12, wherein the at least one credit event is selected from a group consisting of:
bankruptcy of the lessee;
restructuring of the lessee entity;
the lessee's failure to pay a previously agreed financial obligation;
the lessee's failure to make at least one of the lease payments; and
other events that significantly impairs the lessee's creditworthiness.

14. The system according to claim 12, wherein the strike price is a predetermined percentage of the corresponding estimated potential losses.

15. The system according to claim 12, wherein the strike price is 100% of the corresponding estimated potential losses.

16. The system according to claim 12, wherein the put option is sold to the lessor at a premium that is determined based at least in part on a recovery rate of the claim against the lessee.

17. The system according to claim 12, wherein the data processor and the data storage device are further configured to stipulate one or more pre-conditions that the lessor must meet before exercising the put option, the one or more pre-conditions being selected from a group consisting of:
a definitive rejection or repudiation of the lease agreement by the lessee;
an acknowledgement of bankruptcy or insolvency status from the lessee;
commercially reasonable efforts made by the lessor to mitigate actual losses; and
a cancellation of the lease agreement by a bankruptcy court.

18. The system according to claim 12, wherein the data processor and the data storage device are further configured to:
receive a delivery or assignment of the claim from the lessor when the lessor chooses to exercise the put option; and
pay the lessor the strike price in return for the delivery or assignment.

19. The system according to claim 12, wherein the strike price is a predetermined percentage of the judicially confirmed or modified claim amount.

20. The system according to claim 12, wherein the put option is provided to the lessor prior to a first lease payment under the lease agreement.

21. The system according to claim 12, wherein the put option is provided to the lessor subsequent to a first lease payment under the lease agreement but prior to any credit event or expiration of the lease agreement.

22. The system according to claim 12, wherein the data processor and the data storage device are further configured to transfer the put option to a party other than the lessee.

* * * * *